United States Patent [19]

Brandt, Jr.

[11] Patent Number: 5,129,266
[45] Date of Patent: Jul. 14, 1992

[54] MECHANICAL WEIGH BEAM AND DAMPING CIRCUIT THEREFOR

[75] Inventor: Robert O. Brandt, Jr., Wilmington, N.C.

[73] Assignee: Eastern Instrument Laboratories, Inc., Wilmington, N.C.

[21] Appl. No.: 662,429

[22] Filed: Feb. 28, 1991

[51] Int. Cl.$^5$ ............................................. G01D 3/04
[52] U.S. Cl. ...................................... 73/862.63; 73/526
[58] Field of Search ............... 73/862.63, 766, 861.72, 73/861.73, 861.74, 24.03, 526, 496, 430, DIG. 10

[56] References Cited

U.S. PATENT DOCUMENTS

| | | | |
|---|---|---|---|
| 3,365,941 | 1/1968 | Grant | 73/862.63 X |
| 3,605,953 | 9/1971 | Caldwell et al. | |
| 3,813,946 | 6/1974 | Robbins, Jr. et al. | 73/430 |
| 4,490,803 | 12/1984 | Briggs | |
| 4,525,081 | 6/1985 | Myhre | 73/430 X |
| 4,627,635 | 12/1986 | Koleda | |
| 4,955,270 | 9/1990 | Volk, Jr. | 73/861.73 X |
| 5,014,554 | 5/1991 | Terada et al. | 73/526 |

OTHER PUBLICATIONS

Ort, W. "The Latest in-Foil Strain Gages versus Thin Film Strain Gages" (Sep. 18-22, 1978, 6th Int. Conf. on Experimental Stress Analysis) pp. 285-289.

*Primary Examiner*—Reinhard J. Eisenzopf
*Assistant Examiner*—E. Shopbell
*Attorney, Agent, or Firm*—Rosenthal & Putterman

[57] ABSTRACT

A load cell suitable for the measurement of discrete events having an output substantially free of resonant frequencies is disclosed. The load cell includes a visco-elastic polymer bonded thereto as well as accompanying control circuitry for maintaining the visco-elastic at a constant temperature to stabilize the load cell output in the event ambient temperature varies.

16 Claims, 3 Drawing Sheets

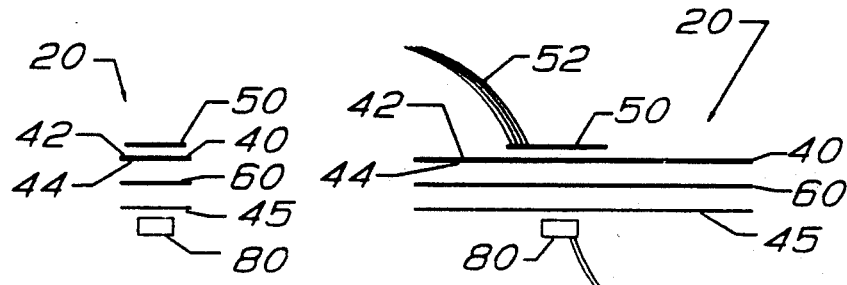
Figure 7
Figure 6
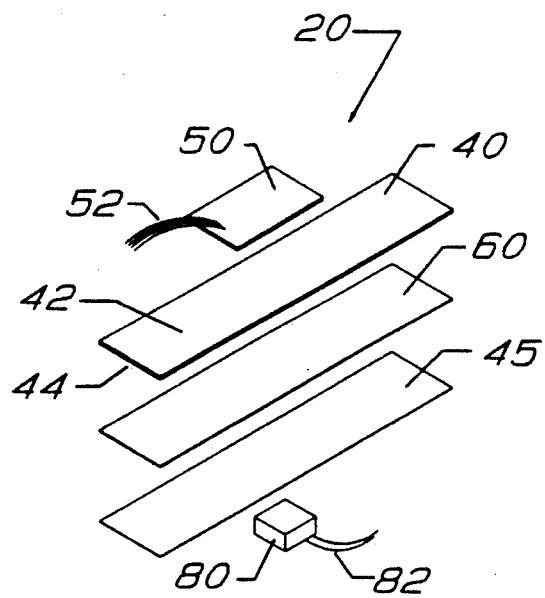
Figure 5

MECHANICAL WEIGH BEAM AND DAMPING CIRCUIT THEREFOR

FIELD OF THE INVENTION

This invention relates generally to the field of mechanical weigh beams and, more particularly, to mechanical weigh beams that include damping means that reduce resonant frequencies and thereby increase measurement accuracy.

BACKGROUND OF THE INVENTION

Beam or planar load cells, per se, are well known. They generally consist of a metal substrate with a semiconductor or metal foil bridge, such as a Wheatstone bridge circuit mounted on one surface of the substrate. In use, the deformation forces acting on the substrate are translated into a proportional change in electrical resistance at each of the four outputs of the Wheatstone bridge. This change in resistance is then used to obtain various types of information about the system in which the load cell is used. For example, load cells have found wide application in the measurement and tracking of continuous flow production processes wherein a change in flow rate translates into a corresponding change in the load cell output resistance which can then be output to a control device, such as a computer, that is used to appropriately adjust parameters to stabilize the process at the desired flow rates. However, load cells have generally not found wide applications in measurement of discrete events of short duration as the length of time needed by the load cell to produce a stable output signal, substantially free of resonant frequencies and noise, was longer than length of the event, the measurement of which was being attempted.

In view of the foregoing, it is, accordingly, an object of the present invention to provide a planar load cell that is capable of accurately measuring events of short duration.

Another object of the present invention is to provide a load cell that is substantially free of resonant frequencies and noise.

Still another object of the present invention is to provide a load cell that is inexpensive and easy to use.

Yet another object of the present invention is to provide a load cell that provides a stable output under conditions of varying temperature.

SUMMARY OF THE INVENTION

In accordance with the present invention, there is provided a load cell characterized by its ability to accurately measure applied forces of short duration and to produce an output signal that is a function of the applied force that is substantially free of resonant vibration. The load cell takes the form of an elongate substantially flat substrate having a first surface and a second surface. A strain gauge means is mounted to one of the surfaces and includes output means for providing an output signal as a function of the force applied to the substrate. The load cell also includes a damping means that coats at least a portion of one of the substrate surfaces. Thus, a force applied to and acting to deform the load cell is translated into an output signal that is substantially free of resonant vibration that is a function of the deforming force applied thereto.

In a further development of the invention, the load cell further includes a temperature control means for maintaining the damping means at a predetermined constant temperature.

BRIEF DESCRIPTION OF THE DRAWINGS

Some of the objects of the invention having been stated, others will appear as the description proceeds when taken in connection with the accompanying drawings in which

FIG. 5 is an exploded view, taken in perspective of a second embodiment of the invention including a temperature control circuit of the present invention.

FIG. 6 is an exploded side view of a second embodiment of the weigh beam of the invention including a temperature control circuit of the invention.

FIG. 7 is an exploded end view of a second embodiment of the weigh beam according to the present invention including a temperature control circuit.

DETAILED DESCRIPTION OF THE PREFERRED EMBODIMENTS

While the present invention will be described more fully hereinafter with reference to the accompanying drawings, in which particular embodiments are shown, it is to be understood at the outset that persons skilled in the art may modify the invention herein described while still achieving the favorable results of this invention. Accordingly, the description which follows is directed to persons of skill in the appropriate arts and not as limiting upon the present invention.

Figure 1:
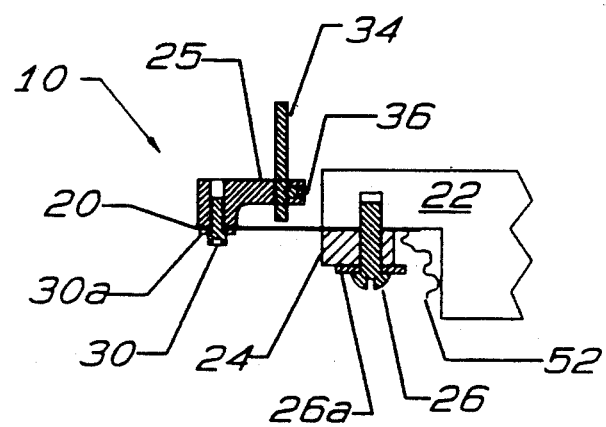
FIG. 1 is a side view of a weigh beam according to the present invention incorporated into a measuring apparatus.

Weigh beams or load cells, as they are also commonly referred to, such as generally indicated at 20, find wide application in measurement and process control systems. They are ideal for converting an applied mechanical force into a linearly proportional electrical output. An exemplary use of such a weigh beam in a force sensing or measurement system, generally indicated at 10, is illustrated in FIG. 1. The force sensing system includes a weigh beam 20 that is secured to a mounting base 22 through a beam mounting block 24. An attaching screw 26 extends through beam mounting block 24 and with the assistance of a washer 26a secures beam mounting block 24 and beam 20 to the mounting base 22 of the measurement system 10.

Secured to the opposite end of weigh beam 20 is a mounting bracket 25 Mounting bracket 25 is secured to weigh beam 20 via screw 30 and associated washer 30a.

A rod or displacement transfer link 34 is adjustably mounted within bracket 25 by set screw 36. Rod 34 extends upwardly over the central portion of the weigh beam 20. This arrangement is commonly referred to as an S-loaded weigh beam which yields greater force multiplication as bending of the beam affects two locations and, therefore, exaggerates loading on the sensors as will be more fully described hereinbelow. It will be noted, that the benefits and advantages of the present invention can be achieved with equal efficacy when other beam loading arrangements such as cantilevers are employed.

Figure 8:
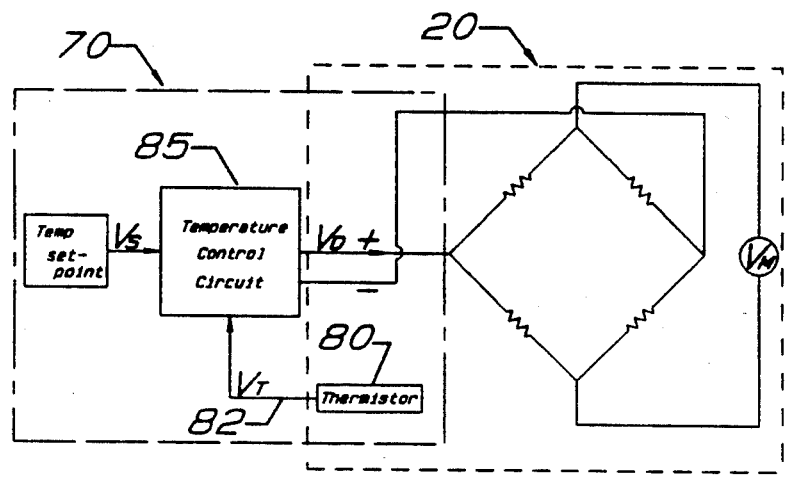
FIG. 8 is a schematic diagram of the weigh beam and the temperature control circuit therefor of the present invention.
Figure 2:
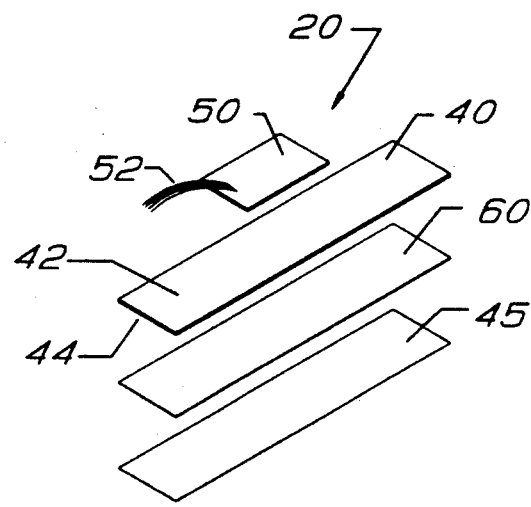
FIG. 2 is an exploded view, taken in perspective, of a first embodiment of the weigh beam of the present invention.
Figure 3:
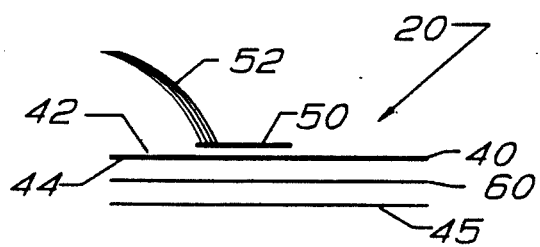
FIG. 3 is an exploded side view of a first embodiment of the weigh beam of the present invention.
Figure 4:
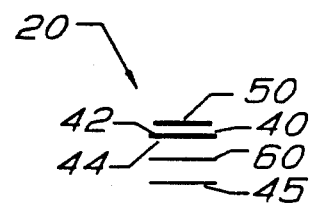
FIG. 4 is an exploded end view of a first embodiment of the weigh beam of the present invention.

Turning now to FIGS. 2 through 4, a first embodiment of the load cell or weigh beam 20 according to the present invention is there illustrated. The load cell 20 is characterized by its ability to accurately measure applied force of short duration (between about three seconds and two milliseconds) and to produce an output signal $V_M$ that is a function of the applied force that is substantially free of resonant vibration (see FIG. 8). The load cell 20 comprises a beam member 40, a strain gauge 50 and a damping means 60.

The beam member 40 comprises an elongate substantially flat substrate having a first surface 42 and a second surface 44.

A strain gauge means or strain gauge 50 is mounted to one of the surfaces (in the illustrated embodiment surface 42). The preferred strain gauge is a semiconductor or metal foil Wheatstone bridge, well known to those skilled in the art. The strain gauge and beam member units are usually purchased preassembled as an off the shelf unit from suppliers such as Omega electronics (see for example, part numbers LCL 454G and LCL 113G). As the Wheatstone bridge generates four output signals, four output wires 52 therefrom are, accordingly, provided. Two leads carry as inputs to the bridge the signal $V_D$ and two leads carry as outputs from the bridge the signal proportional to load cell deformation, $V_M$, as will be more fully explained hereinbelow.

The load cell also includes a damping means or viscoelastic polymer 60 that coats at least a portion of one of the surfaces 42, 44 of beam member 40. Visco-elastic polymers suitable for use in the load cell 20 of the present invention are of the SCOTCHDAMP ® family as manufactured by the 3M Company. In the illustrated embodiment, the viscoelastic polymer is bonded to the entire underside of the beam member 40 according to conventional methods. However, it will be noted that coating the entire under surface may not necessarily be required, depending on the sensitivity needed for a particular measurement application. In addition, should further damping be required, the visco-elastic may be sandwiched between beam member 40 and a second substrate 45 or metal constraining layer (such as stainless steel) as shown in FIGS. 2-4 and bonding the substrates together.

The load cell described above is an accurate and reliable measurement tool as long as the temperature of the environment in which it is located remains constant. Those knowledgeable in the use of visco-elastic polymers will certainly be aware of the fact that the energy absorptive properties of visco-elastics vary significantly with even small variations of temperature. Thus, in order for this concept to find the widest application, it is necessary to eliminate the disadvantages associated with the use of viscoelastic polymers under conditions of varying temperature. This is accomplished through the addition of a temperature control means 70 for maintaining the damping means 60 at a predetermined constant temperature and is illustrated in FIGS. 5-8.

The temperature control means 70 functions to measure the actual load cell temperature and to produce an output signal that adjusts the load cell temperature to maintain it at a predetermined constant value.

A temperature sensing means or thermistor 80 is operatively associated with the load cell 20 and produces an output signal $V_T$ in lines 82 that is proportional to the measured load cell temperature. The thermistor is attached to the load cell via conventional means such as an epoxy resin or equivalent means.

A temperature control circuit 85 is provided and is adapted to receive as inputs, a temperature set point signal $V_S$ corresponding to the desired load cell temperature and the thermistor output $V_T$ corresponding to the measured load cell temperature. The temperature control circuit 85 includes means for comparing the difference between the temperature set point $V_S$ and the thermistor output signal VT and for generating a difference signal $V_D$ proportional thereto $[V_D = G \times (V_S - V_T)$ where G is a gain factor]. The difference signal $V_D$ is then fed back to the bridge circuit As was previously mentioned, the bridge circuit is a Wheatstone bridge which is a resistive bridge. Thus, when the excitation voltage $V_D$ is increased, the electrical energy or power dissipated in the resistors also increases which acts to adjust (heat) the load cell as well as the viscoelastic polymer. Similarly, when the excitation voltage $V_E$ decreases, the electrical energy dissipated by the bridge decreases, thus, lowering the temperature of load cell 20. It will be noted that integral control may be used with equal efficacy to generate the signal $V_D = G (V_S - V_T)$.

In operation, a force to be measured is applied to force displacement link 34. This force is translated into a deforming force in beam 20 which also similarly acts on strain gauge 50. This causes the resistance of each of the strain gauge elements to change This change in resistance is output through electrical connections 52 to a data processing system for use as desired.

With respect to the temperature stabilization feature, the thermistor 80 constantly monitors the actual load cell temperature. The signal representative thereof $V_T$ is generated and is one of two input signals to temperature controller circuit 85. The temperature controller circuit 85 also receives a second input signal which is a temperature set point signal $V_S$. These two signals, $V_T$, $V_S$ are compared by temperature controller circuit 85 which generates a difference signal $V_D$ which is proportional to the difference between $V_T$ and $V_S$. This difference signal $V_D$ is then fed back to the bridge circuit 50 to increase or decrease the power dissipation thereof to maintain the load cell 20 at the predetermined constant temperature. An important feature of the present invention resides in the circuit as described above in that the bridge output signal $V_M$, is ratiometric to bridge excitation voltage, $V_D$, so that to have a signal that is representative of only strain (and not temperature), $V_M$ must be divided by $V_D$, with additional circuitry, such as with an analog or digital multiply/divide unit, not shown, but well known to those skilled in the art.

The foregoing embodiments and examples are to be considered illustrative, rather than restrictive of the invention, and those modifications which come within the meaning and range of equivalence of the claims are to be included therein.

That which is claimed is:

1. A load cell characterized by its ability to accurately measure discrete applied forces of short duration and to produce an output signal that is a function of the applied force that is substantially free of resonant vibration and comprising:

an elongate substantially flat substrate having a first surface and a second surface;
a strain gauge means mounted to one of said surfaces, said strain gauge means including output means for providing an output signal as a function of the force applied said substrate; and a damping means coating at least a portion of one of said surfaces;

whereby the force applied to and acting to deform the load cell is translated into an output signal, substantially free of resonant vibration and as a function of the force applied thereto.

2. A load cell according to claim 1 wherein said strain gauge means produces an output signal that is substantially proportional to the force applied to said substrate.

3. A load cell according to claim 1 wherein said strain gauge means comprises a metal foil strain gauge.

4. A load cell according to claim 1 wherein said strain gauge means comprises a semiconductor strain gauge.

5. A load cell according to claim 1 wherein said strain gauge means comprises a deposited strain gauge.

6. A load cell according to claim 2 wherein said strain gauge comprises a partial bridge circuit.

7. A load cell according to claim 2 wherein said strain gauge means comprises a full Wheatstone bridge circuit.

8. A load cell according to claim 1 wherein said damping means comprises a visco-elastic polymer.

9. A load cell according to claim 1 further including a second substrate and wherein said damping means is positioned in sandwich fashion between said substrate and said second substrate and bonding said substrates together.

10. A load cell according to claim 1 further including a temperature control means for maintaining said damping means at a predetermined constant temperature.

11. A load cell according to claim 10 wherein said temperature control means further includes:
(a) a temperature sensing means operatively associated with said load cell and adapted to output an output signal proportional to a measured load cell temperature;
(b) a set point temperature input signal corresponding to a desired damping means set point temperature;
(c) means for comparing the difference between the set point temperature input signal and the measured load cell temperature signal and for generating a difference signal proportional thereto; and
(d) said difference signal being fed back to said strain gauge means to vary the power thereof and thereby adjust the damping means temperature in proportion to the magnitude of said difference signal, whereby the temperature of the damping means is maintained at the predetermined temperature.

12. A load cell characterized by its ability to accurately measure applied forces of short duration and to produce an output signal proportional to the applied force that is substantially free of resonant vibration and comprising:
an elongate thin substantially flat substrate having a first surface and a second surface;
a semiconductor strain gauge mounted to one of said surfaces, said strain gauge including an output means for providing an output signal as a function of the force applied to said substrate; and
a visco-elastic polymer coating at least a portion of one of said surfaces for absorbing resonant vibration;
whereby the force applied to and acting to deform the load cell is translated into an output signal, substantially free of resonant vibration and as a function of the force applied thereto.

13. A load cell according to claim 12 wherein said semiconductor strain gauge comprises a Wheatstone bridge.

14. A load cell according to claim 1 further including a temperature control means for maintaining said visco-elastic polymer at a predetermined constant temperature.

15. A load cell according to claim 14 wherein said temperature control means further includes:
(a) a temperature sensing means operatively associated with said load cell and adapted to output an output signal proportional to a measured load cell temperature;
(b) a set point temperature input signal corresponding to a desired visco-elastic set point temperature;
(c) means for comparing the difference between the set point temperature input signal and the measured load cell temperature signal and for generating a difference signal proportional thereto; and
(d) said difference signal being fed back to said Wheatstone bridge circuit to vary the power thereof and to thereby adjust the damping means temperature in proportion to the magnitude of said difference signal, whereby the temperature of the visco-elastic polymer is maintained at the predetermined temperature.

16. A load cell according to claim 15 further including a second substrate and wherein said visco-elastic polymer is positioned in sandwich fashion between said substrate and said second substrate and bonding said substrate together.

* * * * *

UNITED STATES PATENT AND TRADEMARK OFFICE
CERTIFICATE OF CORRECTION

PATENT NO. : 5,129,266
DATED : July 14, 1992
INVENTOR(S) : Robert O. Brandt, Jr.

It is certified that error appears in the above-identified patent and that said Letters Patent is hereby corrected as shown below:

Column 6, line 24, delete "claim 1" and insert therefor --claim 13--.

Signed and Sealed this

Thirty-first Day of August, 1993

Attest:

Attesting Officer

BRUCE LEHMAN

Commissioner of Patents and Trademarks